W. WATERS.
MILK BOTTLE CLOSURE.
APPLICATION FILED MAR. 9, 1915.
1,171,487.
Patented Feb. 15, 1916.
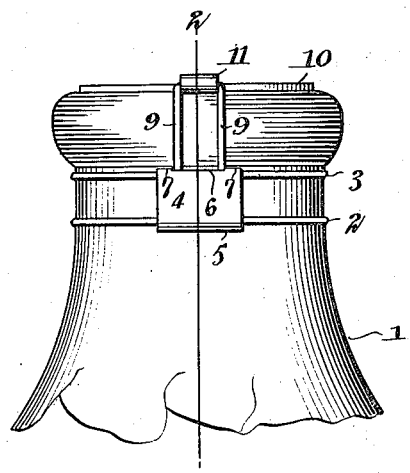
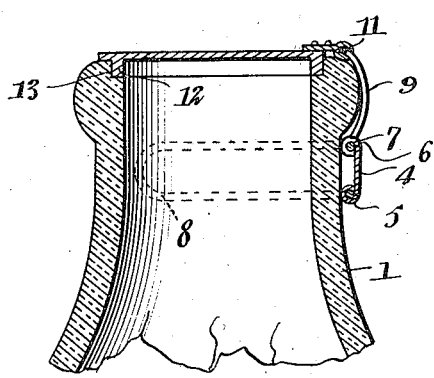
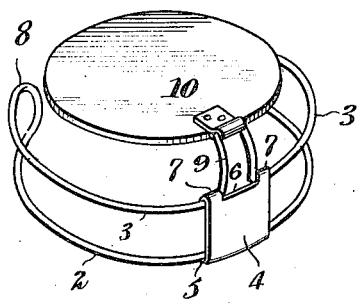
Inventor
William Waters.
Witnesses
Frederick W. Ely.
P. H. Pattison
By Mansell D. Mills
Attorney

UNITED STATES PATENT OFFICE.

WILLIAM WATERS, OF WEST RUTLAND, VERMONT.

MILK-BOTTLE CLOSURE.

1,171,487.  Specification of Letters Patent.  Patented Feb. 15, 1916.

Application filed March 9, 1915. Serial No. 13,298.

*To all whom it may concern:*

Be it known that I, WILLIAM WATERS, a citizen of the United States, residing at West Rutland, in the county of Rutland and State of Vermont, have invented certain new and useful Improvements in Milk-Bottle Closures, of which the following is a specification.

This invention relates to new and useful improvements in caps or covers for milk bottles, and has for its primary object to provide a device which is readily attached and detached from the ordinary milk bottle.

A further object of the invention is to provide a device of this character which will be simple in construction.

A further object of the invention is to provide a milk bottle closure which will be cheap to manufacture, thereby providing a device which can be given away by different firms who may place their advertisement thereon.

Referring to the drawings; Figure 1 is an elevation showing the milk bottle partially broken away; Fig. 2 is a vertical sectional view of a portion of a milk bottle showing the cap attached thereto, and Fig. 3 is a perspective view of the cap.

Referring more particularly to the drawings, the reference character 1 represents the neck of a milk bottle which is of the ordinary construction.

As shown in Fig. 3 the attachment comprises a substantially U-shaped resilient member composed of two parallel strands of wire 2 and 3, these strands being spaced apart and secured in said spaced relation intermediate of the ends of the U-shaped member by means of a metallic plate 4. The lower edge of the metallic plate 4 is bent around the resilient member 2 as shown at 5, and the upper edge of the plate 4 is cut out as at 6 to provide two spaced tongues 7, said tongues being bent downwardly over the resilient member 3. The free ends of the wire from which the U-shaped member is formed are secured within the rolled over portion 5 of the plate 4, the ends of the U-shaped member being looped as at 8.

The upper resilient member 3 is provided at a point intermediate of the two ends 8 of the U-shaped member with a substantially U-shaped loop 9 which serves as a means for hingedly securing the cap 10 to the resilient member, said cap being provided with a hinge 11 for this purpose.

The cap 10 consists of a sheet of metal circular in cross section and is provided on its under face with a depending annular flange 12 which latter is preferably of a diameter equal to the diameter of the recess 13 in the upper portion of the milk bottle and is adapted to be received therein as shown in Fig. 2. The upper face of the cap 10 is adapted to receive any suitable advertising matter, thus providing a device which may be distributed among the several consumers for use with milk bottles.

From the foregoing it will be seen that I have devised a cap for milk bottles which is readily applied to any standard milk bottle after the ordinary pasteboard cap or disk has been removed therefrom.

Having thus described my invention what I claim as new, and desire to protect by Letters Patent is:

1. A closure for milk bottles comprising a resilient neck engaging member comprising a single strand of wire having a loop formed intermediate its ends, and bent upon itself to form a pair of semi-circular spaced arms, a metallic plate having one of its edges bent around one of the strands of wire to secure the free ends thereof together, and having its other edge cut out to receive said looped portion, and a closing disk pivoted in said looped portion.

2. A closure for milk bottles comprising a resilient neck engaging member formed by bending a single piece of wire intermediate of its ends to form a loop, the free ends of the loop being bent in opposite directions from the loop and being subsequently turned backwardly upon themselves to form parallel strands in spaced relation and means for holding said strands in said relation, said means comprising a metallic plate having one of its edges bent around the free ends of the strand of wire and having its oppositely disposed edge bifurcated to receive the loop and having the furcations bent around the strand of wire on opposite sides of said loop, and a closure disk pivotally mounted in said loop.

In testimony whereof I affix my signature in presence of two witnesses.

WILLIAM WATERS.

Witnesses:
    RODGER DWYER,
    L. R. NOBLE.